United States Patent Office 2,851,024
Patented Sept. 9, 1958

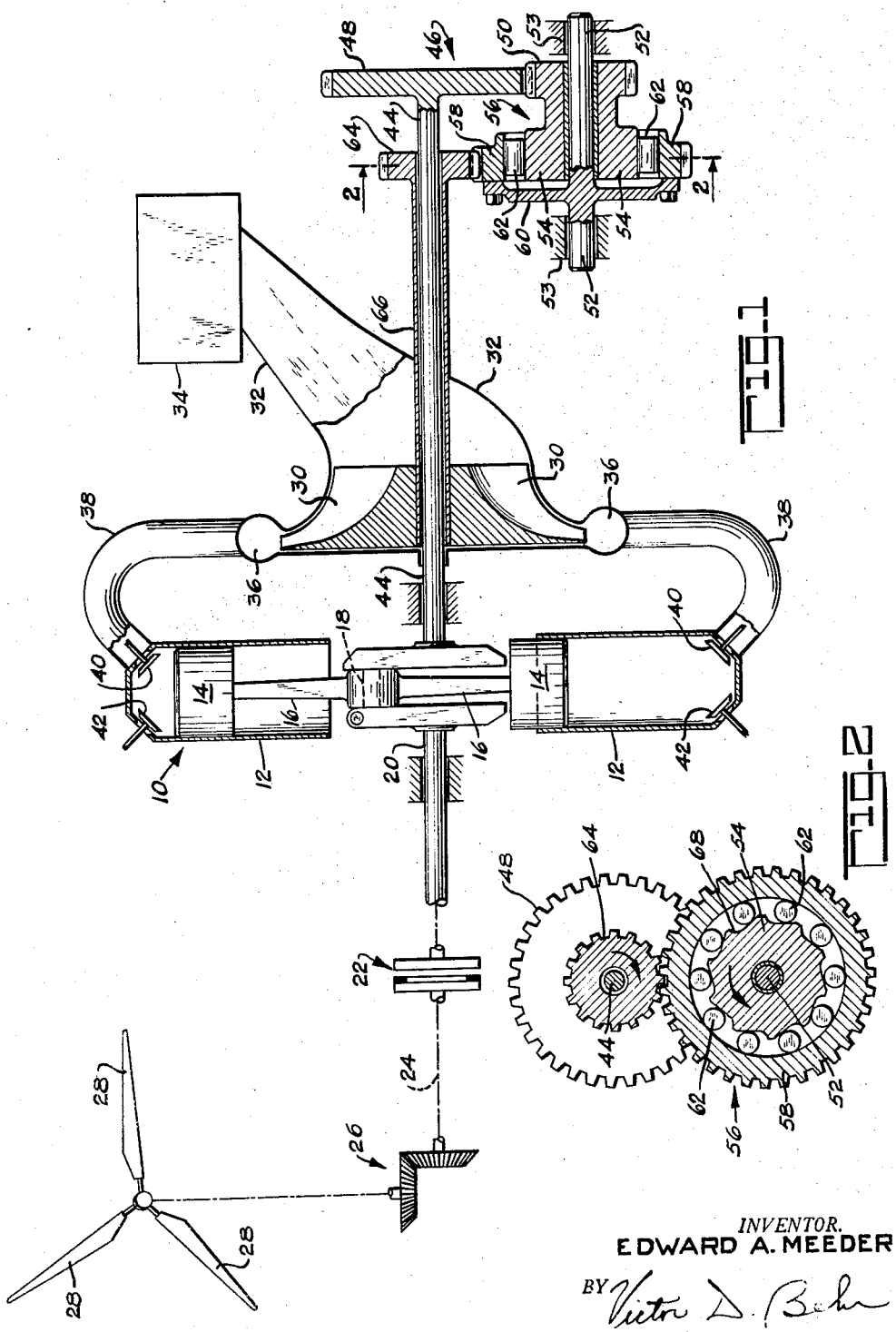

2,851,024

ONE-WAY SUPERCHARGER DRIVE

Edward A. Meeder, Clifton, N. J., assignor to Curtiss-Wright Corporation, a corporation of Delaware Application April 13, 1956, Serial No. 578,109

1 Claim. (Cl. 123—119)

This invention relates to internal combustion engines and is particularly directed to supercharged internal combustion engines for helicopters.

In the case of aircraft powered by a conventional arrangement of a piston engine and propeller, the propeller acts as a flywheel to keep the angular velocity of the crankshaft more nearly constant. In the case of a helicopter installation however the engine generally is disposed at some distance from the helicopter rotors. This results in a relatively resilient drive connection between the engine and the helicopter rotors as compared to the conventional engine to propeller connection. Therefore the flywheel effect of the helicopter rotors on its engine is relatively small compared to that of a propeller in a conventional engine and aircraft propeller combination. Also, in the case of a helicopter it is conventional to provide a clutch between the engine and helicopter rotors so that when the clutch is disengaged even the small flywheel effect otherwise provided by the rotors is lost.

Aircraft engines generally have a supercharger driven at high speed by the engine crankshaft for compressing the engine air supply. If excessive vibratory torque exists in the step up gearing between the engine crankshaft and the supercharger the stresses and gear tooth loads in said gearing become excessive. This is particularly the situation in the case of a helicopter engine when the engine is running decoupled from the helicopter rotors and to a lesser extent when coupled. The addition of a flywheel to the helicopter engine for minimizing said vibratory torque loads is objectionable because of the necessity of keeping the weight down. An object of the present invention comprises the provision of a novel and simple supercharger drive which minimizes the vibratory torque loads in the supercharger drive resulting from torsional vibrations in the engine crankshaft system. In accordance with the invention a one-way clutch is incorporated between the engine and its supercharger.

Other objects of the invention will become apparent upon reading the annexed detailed description in connection with the drawing in which:

Fig. 1 is a diagrammatic view of an aircraft internal combustion engine for a helicopter embodying the invention; and Fig. 2 is a sectional view taken along line 2—2 of Fig. 1.

Referring to the drawing an aircraft internal combustion engine 10 for a helicopter is schematically illustrated as comprising a plurality of engine cylinders 12 in which pistons 14 are slidably mounted. Connecting rods 16 operatively connect the engine pistons to a crankpin 18 of the engine crankshaft 20. The engine 10 also includes a clutch 22 for connecting the engine crankshaft 20 to the engine output drive shaft 24. The drive shaft 24 is connected by suitable gearing, indicated at 26, to the rotors 28 of a helicopter.

The engine 10 also includes a supercharger having an impeller 30. As illustrated the supercharger 30 is a conventional centrifugal-type supercharger. Air is supplied to the supercharger impeller 30 by a duct 32 including the air passage of a carburetor 34 or other air-fuel metering device. The supercharger impeller 30 supplies compressed air to an annular manifold 36 from which it is distributed by intake pipes 38 to the engine cylinders under control of the cylinder intake valves 40. As illustrated each cylinder 12 also has the usual exhaust valves 42.

The supercharger impeller 30 is drivably connected to a rearward extension 44 of the engine crankshaft 20 by a transmission indicated at 46 for driving the supercharger at a speed substantially above crankshaft speed. In the case of a helicopter, the crankshaft-supercharger transmission is a single speed-ratio transmission since helicopters fly in only a limited low altitude range.

The speed step-up transmission 46 includes a gear 48 on the crankshaft extension 44, said gear 48 meshing with a smaller gear 50 mounted for rotation about a shaft 52 having fixed bearings 53. The gear 50 has a portion forming the inner or cam member 54 of a one-way roller clutch 56. The one-way clutch 56 also includes an outer ring member 58 bolted to an annular flange 60 on the shaft 52 whereby the shaft 52 pilots the one-way clutch ring member 58. One-way clutch rollers 62 are disposed between the one-way clutch cam member 54 and the one-way clutch outer ring member 58. The clutch ring member 58 is provided with gear teeth meshing with a gear 64 on the impeller drive shaft 66.

The one-way clutch 56 is of conventional construction. As shown in Fig. 2 the one-way clutch cam member 54 has a plurality of circumferentially-spaced cam surfaces 68 which cooperated with the ring member 58 to form wedge-shaped spaces within which the clutch rollers 62 are disposed. With the direction of rotation indicated in Fig. 2, when the engine tends to overrun the supercharger impeller the one-way clutch rollers 62 wedge in said wedge-shaped spaces to drive the supercharger impeller 30. On the other hand, when the supercharger impeller 30 tends to overrun the engine, the one-way clutch ring member 58 overruns the clutch cam member 54 so that no torque is transmitted from the supercharger impeller to the engine crankshaft.

The provision of the one-way clutch 56 is quite important in increasing the life of the gears of the transmission 46. Thus when the clutch 22 disconnects the helicopter rotors 28 from the engine 10 the flywheel effect of said rotors on the engine is removed whereupon engine torque fluctuations increase. In the absence of the one-way clutch 56 such torque fluctuations may impose excessive loads on the gear teeth of the transmission 46 to cause failure of said teeth. With the one-way clutch 56, however, peak torque loads in the transmission 46 are greatly reduced.

While I have described my invention in detail in its present preferred embodiment, it will be obvious to those skilled in the art, after understanding my invention, that various changes and modifications may be made therein without departing from the spirit or scope thereof. I aim in the appended claim to cover all such modifications.

I claim as my invention:

An aircraft internal combustion engine for driving the rotors of a helicopter; said engine comprising a crankshaft; a helicopter rotor drive shaft; a clutch engageable for drivably connecting said crankshaft to said rotor shaft, said clutch being disengageable to disconnect said driving connection; a supercharger including an impeller rotatable for compressing air supplied to the cylinders of said engine; a transmission including a one-way clutch drivably connecting said crankshaft to said impeller, said transmission providing only a single speed-ratio and said one-way clutch being disposed in said driving connection for transmitting torque from said crankshaft to said impeller but not from said impeller to said crankshaft.

References Cited in the file of this patent

UNITED STATES PATENTS

| 1,785,319 | Lansing | Dec. 16, 1930 |
| 2,011,336 | Gregg | Aug. 13, 1935 |
| 2,440,225 | Pullin | Apr. 20, 1948 |
| 2,644,535 | Koup et al. | July 7, 1953 |